United States Patent [19]
Borzym

[11] Patent Number: 4,624,168
[45] Date of Patent: * Nov. 25, 1986

[54] APPARATUS FOR CUTTING HEAVY WALL TUBE

[75] Inventor: John J. Borzym, Birmingham, Mich.

[73] Assignee: Alpha Industries, Inc., Novi, Mich.

[ * ] Notice: The portion of the term of this patent subsequent to Dec. 25, 2002 has been disclaimed.

[21] Appl. No.: 587,514

[22] Filed: Mar. 8, 1984

Related U.S. Application Data

[62] Division of Ser. No. 422,233, Sep. 23, 1982, Pat. No. 4,457,200.

[51] Int. Cl.⁴ ............................................. B23D 21/00
[52] U.S. Cl. ...................................... 83/862; 83/319; 83/454; 83/320
[58] Field of Search ..................... 83/54, 49, 862, 865, 83/319, 320, 519, 454, 294, 51

[56] References Cited

U.S. PATENT DOCUMENTS

| | | | |
|---|---|---|---|
| 3,129,624 | 4/1964 | Aver | 83/319 X |
| 3,449,993 | 6/1969 | Temple | 83/519 X |
| 4,036,091 | 7/1977 | Borzym | 83/319 |
| 4,294,147 | 10/1981 | Borzym | 83/319 X |

Primary Examiner—James M. Meister
Assistant Examiner—John L. Knoble
Attorney, Agent, or Firm—Krass and Young

[57] ABSTRACT

Apparatus for cutting heavy wall tubing including vertical and horizontal mechanically driven rams operated in sequence to drive blades fully through a tubing section. Notching blades cut shallow notches in the section in advance of the main blade entries thereby to prevent dimpling.

6 Claims, 6 Drawing Figures

APPARATUS FOR CUTTING HEAVY WALL TUBE

This application is a division of application Ser. No. 422,233, filed 9/23/82, now U.S. Pat. No. 4,457,200.

TECHNICAL FIELD

This invention relates to the cutting of tubing and more particularly to a method and apparatus for cutting thick wall tubing in a double stroke operation.

BACKGROUND OF THE INVENTION

There are a number of techniques for cutting or severing tubing into lengths. One technique involves the use of a rotary saw but suffers from the disadvantages of slow speed, noise and air pollution due to the generation of shrapnel. A second technique involves a quillotine-type cut using a blade which is driven through the tubing along a diameter thereof. This technique is preferable to the rotary saw from the standpoints of speed, noise and air pollution.

A blade-type cutting mechanism which produces a smooth dimple-free cut of round tubing in a single ram stroke is disclosed in U.S. Pat. No. 4,337,680 issued July 6, 1982. In that mechanism, a notching blade is drawn across the tube to notch a top section thereof prior to the entry of a vertically traveling cutting blade the width of which is sufficient to sever the entire tube.

It is well understood that the blade type tube cutting or severing technique involves the generation of a slug of tubing material representing the volume of the tubing in the path of the severing blade and that the formation and flow of this slug affects the character of the cut. The cutting blade is typically shaped so as to cause the cutting action to move progressively along the leading blade edge or edges to distribute wear and facilitate the flow or slug material. However, at a point part way into the tubing, the angle between a tangent to the blade edge and a tangent of the tube wall at the point of contact is nearly 90° and the power required to continue the cut increases rapidly at this point. This power requirement is increased when the wall thickness of the tubing is relatively great and in some instances the difficulty may be such as to stall the cut off machine. Moreover, the cutting blade wears at a much greater rate in the area of the non-progressive cut and this, in many cases, becomes the limiting factor on blade life.

BRIEF SUMMARY OF THE INVENTION

The object of the present invention is to provide apparatus for facilitating the blade-type cutting of tubing of various shapes, to reduce blade wear, increase blade life and to reduce the power required to cut a given tube.

According to the invention, an apparatus is provided for cutting relatively thick wall tubing in a two-stroke fashion. In general this apparatus comprises first and second ram means defining first and second work stroke paths, a first cutting blade which cuts through a section of tubing but which is of a width less than the maximum inside diameter of the tubing measured across the stroke path thereby to leave at least portions of the side walls uncut, and a second cutting blade which is operable by the second ram means to enter a side section of the tubing and be driven entirely through the remaining uncut portions of tubing to complete the severing operation. The apparatus finally comprises means for sequentially controlling the operation of the first and second ram means.

The apparatus preferably comprises means for clamping the tubing during the two stroke cutting function and a mechanical stop which aids in the support of the clamping means during the second cutting stroke; i.e., the side stroke which is essentially in the direction of operational motion of the clamping means.

The apparatus may be used to cut tubing of various shapes including round, oval, square and rectangular. As is known in the art, rectangular or square section tubing is generally cut on a diagonal; i.e., corner-to-corner, and pre-cut notching or scarfing operations are not required. To cut round tubing in a distortion-free fashion, the apparatus of the invention is readily supplemented to provide notching or scarfing operations as hereinafter described.

It will be understood that the terms "top, bottom, side, vertical and horizontal" are used herein in a relative sense and do not necessarily indicate any particular orientation relative to gravity.

DETAILED DESCRIPTION OF THE SPECIFIC EMBODIMENT

Figure 1:
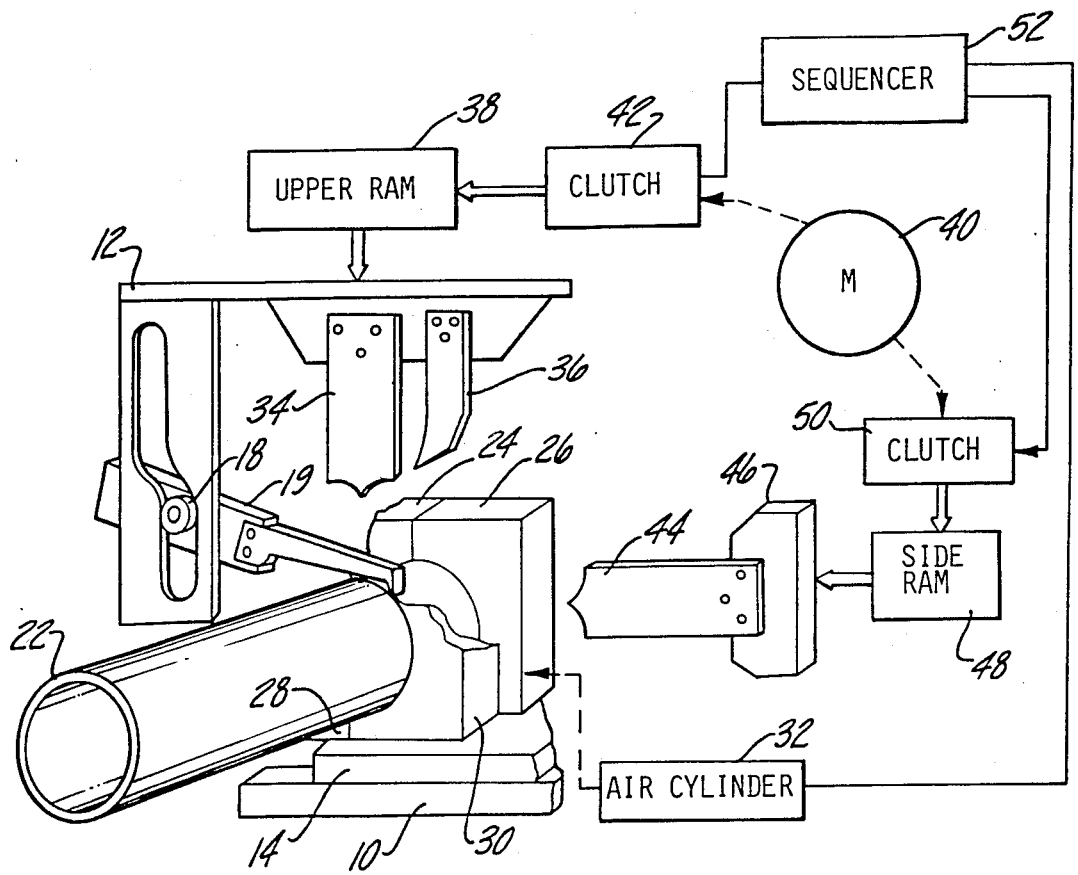
FIG. 1 is a partly schematized perspective view of an apparatus embodying the invention.

Referring to FIG. 1, there is shown an apparatus for cutting steel tubing 22 of relatively thick wall configuration into selected lengths in a distortion-free fashion. This apparatus comprises a base 10 which is preferably a large rigid weldment supporting thereon a die set comprising an upper shoe 12 and a lower shoe 14 mounted for reciprocal motion relative to one another along a vertical path as seen in FIG. 1. Upper shoe 12 has mounted in depending relation thereon an offset cam 16 which engages a follower roller 18 on a notching blade holder 19. Holder 19 carries a horizontal notching blade 20 which is effective when operated to create a notch through the top section of the tubing 22 to initiate the first stroke in the cutting function.

Tubing 22 is preferably clamped and supported between a clamping mechanism comprising jaws 24, 26, 28 and 30, jaws 24 and 26 comprising a first complemental pair and jaws 28 and 30 comprising a second complemental pair which is spaced from the first pair by a gap sufficient to accommodate the notching blade 20. The mechanism for opening and closing the jaws 24, 26, 28 and 30 comprises an air cylinder 2 and a mechanism which will be described in greater detail with reference to FIG. 2.

Upper shoe 12 also carries a first guillotine-type cutting blade 34 mounted for displacement along a first stroke path in the vertical direction and a second notching blade 36 which is effective to notch a side section of the tubing 22 as the first severing blade 34 is driven through the tubing. It is important to note that the width of the blade 34 is less than the inside diameter of the tubing 22 and that the blade 36 is spaced parallel and adjacent the blade 34 by sufficient distance to notch only partly through a side section of the tubing; i.e., operation of the blades 34 and 36 leaves the side sections of the tubing at least partly uncut.

Blades 34 and 36 are operated along with the vertically reciprocal motion of the upper shoe 12 by means of an upper ram 38 which is powered by a motor 40 through a clutch/brake arrangement 42. With the exception of the presence of the second notching blade 36, the apparatus thus far described is essentially similar to the apparatus disclosed in the aforementioned U.S. Pat. No. 4,337,680. It will appreciated that the notching blade 20 is drawn from right to left do not notch the top section of the clamp tubing 22 as the ram 38 causes the blade 34 to descend through the tubing making entry in the area of the notch to avoid dimpling or distortion of the tubing 22 as a result of the cutting function. As a second exception or departure from the apparatus of U.S. Pat. No. 4,337,680, the blade 34 is of a width which is less than the interior diameter of tubing 22 and accordingly the side portions of the tubing are left at least partially uncut.

Continuing now with the description of the apparatus of FIG. 1, a second cutting blade 44 is mounted on a holder 46 connected to a second side ram 48 to be driven by motor 40 through a clutch/brake assembly 50 horizontally through the tubing 22 from right to left as seen in FIG. 1; i.e., through the side section which notched by the vertical descent of blade 36. A sequencer 52 is provided for establishing the proper timing of the operations thus far described; i.e., the upper shoe 12 which is driven by the upper ram 38 goes through an entire descent and ascent stroke cycle prior to the initiation of the horizontal stroke cycle of blade 44 and side ram 48. The width of side blade 44 is preferably less than the outside diameter of tubing 22 so as to avoid interference with the lower shoe 14 or base 10. The absolute width of blade 44 is relatively unimportant so long as it is wide enough to cut the entire remaining uncut side sections of the tubing 22.

Figure 2:
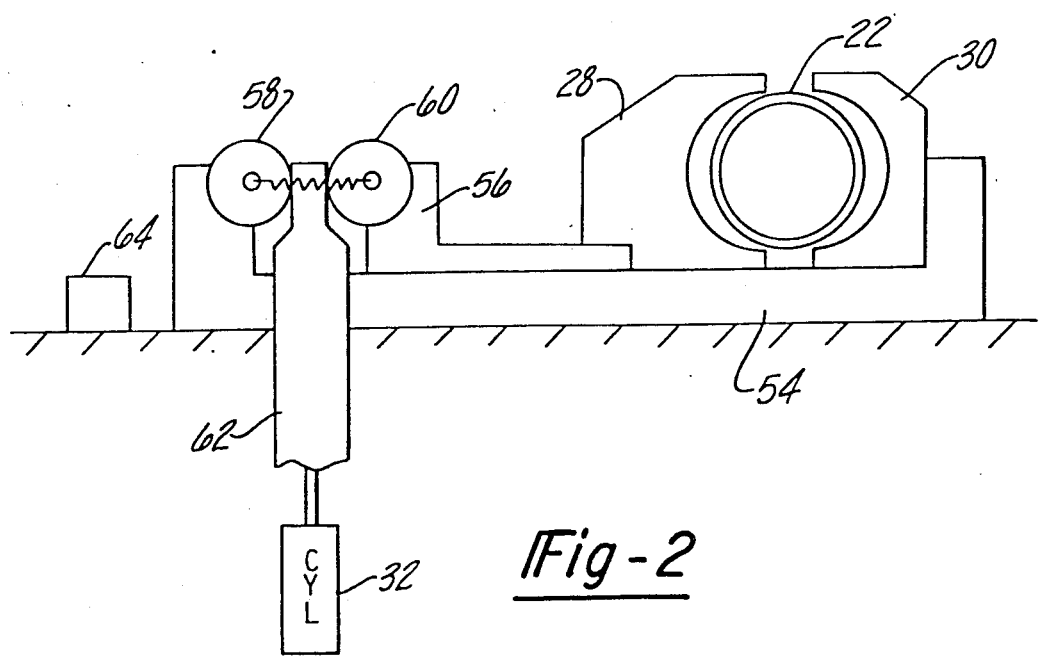
FIG. 2 is a side view of a preferred clamping mechanism used with the apparatus of FIG. 1.

Referring now the FIG. 2, the clamping apparatus for maintaining the tubing 22 in a fixed orientation relative to the vertical and horizontal strokes during the cutting operation will be described. A first jaw holder or die slide 54 is mounted on the base 10 for left to right and right to left sliding motion. This jaw holder 54 carries jaws 26 and 30 and causes them to open and close relative to the tubing 22 as hereinafter described. Slideably mounted on top of the die jaw holder 54 is a second smaller die jaw holder 56 which carries jaws 24 and 28 for reciprocal opening and closing motion as hereinafter described. Die jaw holder 54 carries a cam follower roller 58 and the die jaw holder 56 carries a cam follower roller 60, the cam follower rollers 58 and 60 being biased against opposite sides of a bottle-shaped cam 62 which is reciprocally operated by the cylinder 32. From FIG. 2 it is apparent that as the cam 62 is driven upwardly pushing the rollers 58 and 60 apart the jaws 28 and 30 are caused to clamp the tubing 22. Conversely as the cam 62 is dropped vertically downwardly the rollers 58 and 60 are pulled together to cause the die jaws 28 and 30 to open and unclamp or release the tubing 22.

In addition, a fixed stop 64 is mounted on the base 10 adjacent the lefthand exterior surface of the die jaw holder 54 and is spaced therefrom so that when the dies are closed to clamp the tubing the die jaw holder 58 abuts the fixed stop 64. This fixed stop 64 and the abutting relationship with die jaw holder 54 provides resistance to the forces imposed on the clamping mechanism by the side blade 44 as it is driven from right to left through the tubing 22 as seen in both FIGS. 1 and 2.

Figure 3:
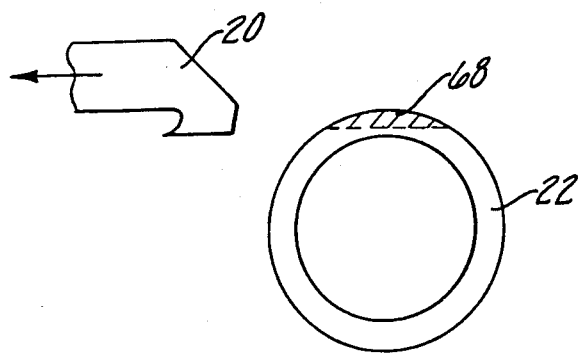
FIG. 3 is a diagram of a first cutting step in a method embodying the invention.
Figure 4:
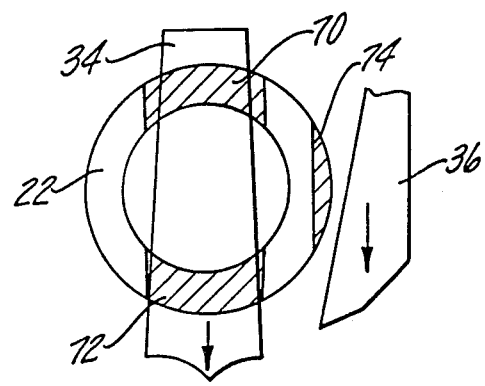
FIG. 4 is a diagram of a second cutting step in a method embodying the invention.
Figure 5:
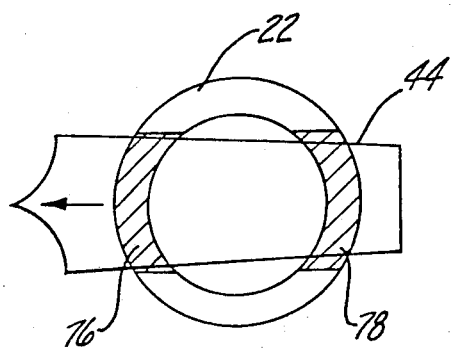
FIG. 5 is a diagram of a third cutting step in a method embodying the invention.

Referring now the FIGS. 3 through 5 the method of the present invention is described in greater detail.

In FIG. 3 the first or horizontal notching blade 20 has completed its stroke from right to left to notch a top section 68 of the tubing 22 to a depth which is less than the radial wall thickness of the tubing. In FIG. 4 the first or vertical severing blade 34 has been driven downwardly through the tubing 22 making entry through the previously notched portion 68 to cut entirely through both top and bottom sections 70 and 72. However, because the blade 34 is of lesser width than the interior diameter of the tubing 22 the side sections of the tubing 22 are left substantially uncut. A partial exception arises out of the fact that the parallel mounted vertical notching blade 36 is driven downwardly along with blade 34 to notch out a side section 74 of the tubing but again to a depth which is less than the radial thickness of the tubing 22. Accordingly, both side sections of the tubing are left at least partly uncut.

FIG. 5 illustrates the final step in the cutting method wherein blade 44 is driven horizontally from right to left through the tubing 22 to clear out and cut entirely through the previously uncut side sections 76 and 78. This completes the cutting function.

Blades 34 and 44 are preferably tapered from the leading or cutting edge toward the bolted end by about 3° so that a progressively narrower blade section goes through the part during the stroke. This prevents dragging the side edges of the blades through the cut tubing.

As previously described, the method of cutting is not limited to the double-ram apparatus of FIG. 1 as the tubing may be rotated between cuts by 90° to permit the method to be carried out using a single ram machine. The essential aspect of the method, however practiced, is that the initial cut be made with a blade having a width less than the maximum inside dimension or the cut section measured across the cut stroke path.

Similarly, the apparatus of the invention need not incorporate a notching capability such as represented in FIG. 1 by blades 20 and 36 if distortion-free ends are not required or if the tube section is square so as to resist distortion when cut.

Figure 6:
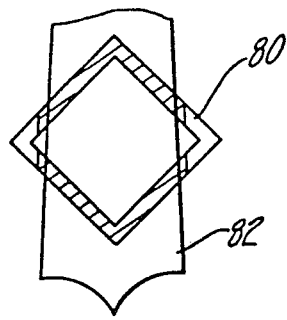
FIG. 6 is a diagram of the first cutting stroke in the method as applied to square-section tubing.

FIG. 6 shows the initial cut of a square section tube 80 which is being cut corner-to-corner to resist deformation. In this case, the blade 82 is of a width which is narrower than the maximum inside dimension corner-to-corner across the tube 80. Whereas the included angle of cut for round tubing is about 90° as shown in FIG. 4, the included angle for square tubing is somewhat greater.

To complete the cut for square tube 80, the tube may be rotated 90° and cut again with blade 82 or, alternatively, cut in a double ram machine such as is shown in FIG. 1 but with blades 20 and 36 removed and using clamping jaws of square internal clamping section.

I claim:

1. Apparatus for cutting tubing comprising:
   a first ram having a continuously driven first stroke path of such length to extend fully through a tubing section,
   a section ram having a continuously driven second path of such length to extend fully through a tubing section which is aligned with and angularly spaced from the first stroke path by about 90′, a first blade operated by the first ram and of sufficient length as to penetrate entirely through both opposite walls of the tubing along the first path but of a width which is less than the maximum inside dimension of the tubing measured across the path, a second blade operated by the second ram to cut through the wall portions of the tubing which are uncut as a result of the first ram operation, and control means for operating said first ram through a cut and return stroke before operating said second ram.

2. Apparatus as defined in claim 1 further including clamping jaw means operable along an axis parallel to the second stroke path to clamp and unclamp the tubing.

3. Apparatus as defined in claim 2 including stop means for positively supporting the jaw means relative to the second ram.

4. Apparatus for severing tubing comprising:
 (a) a first ram defining a first stroke;
 (b) a second ram defining a second stroke path intersecting but angularly spaced from the first stroke path;
 (c) first notching blade means for cutting a first notch through a tube section which lies in the path of the first stroke;
 (d) first cutting blade means of a width less than the inside diameter of the tubing and which is mounted to be driven through the tubing by the first ram;
 (e) second notching blade means mounted adjacent the first cutting blade to be driven by the first ram through the tubing and to notch a second section which lies outside of the first stroke path but within the second stroke path;
 (f) second cutting blade means mounted to be driven through the tubing along the second path; and
 (g) means for sequentially controlling the operations of the first and second rams.

5. Apparatus as defined in claim 4 further including means for clamping the tubing in a fixed orientation relative to the first and second stroke paths.

6. Apparatus as defined in claim 5 wherein the clamping means comprises first and second jaw holders mounted for reversely reciprocal motion relative to the tubing, at least a pair of clamping jaws mounted on respective jaw holders for complementally clamping the tubing, means for operating the jaws between an open, unclamped position and a closed, clamped position, and stop means abutting one of the jaw holders to support the holder in the direction of the second stroke.

* * * * *